United States Patent
Polz et al.

(10) Patent No.: US 7,043,310 B2
(45) Date of Patent: May 9, 2006

(54) DEVICE AND PROCESS FOR OPERATION OF AUTOMATION COMPONENTS

(75) Inventors: Andreas Polz, Erlangen (DE); Martin Kiesel, Poxdorf (DE); Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 691 days.

(21) Appl. No.: 09/965,569

(22) Filed: Sep. 27, 2001

(65) Prior Publication Data
US 2004/0260518 A1 Dec. 23, 2004

(30) Foreign Application Priority Data
Feb. 16, 2001 (DE) ................................ 101 07 748
Jun. 20, 2001 (DE) ................................ 101 29 567

(51) Int. Cl.
*G05B 19/18* (2006.01)

(52) U.S. Cl. ................ 700/66; 700/108; 710/15; 710/17; 710/18; 710/19; 710/73; 340/539.1; 340/539.11; 340/825.69

(58) Field of Classification Search ............ 710/15, 710/17, 18, 19, 73; 700/66, 108; 340/539.1, 340/539.11, 825, 870.01, 825.69
See application file for complete search history.

(56) References Cited

U.S. PATENT DOCUMENTS

| | | | |
|---|---|---|---|
| 5,598,572 A | | 1/1997 | Tanikoshi et al. ........... 395/800 |
| 5,850,187 A | * | 12/1998 | Carrender et al. ......... 340/10.6 |
| 5,867,110 A | * | 2/1999 | Naito et al. ............. 340/286.05 |
| 5,907,491 A | * | 5/1999 | Canada et al. .............. 700/108 |
| 5,950,148 A | * | 9/1999 | Nakagawa et al. ......... 702/182 |
| 6,167,464 A | * | 12/2000 | Kretschmann ............... 710/15 |
| 6,400,997 B1 | * | 6/2002 | Rapp, III ..................... 700/83 |
| 6,417,760 B1 | | 7/2002 | Mabuchi et al. ............ 340/5.3 |
| 6,601,035 B1 | * | 7/2003 | Panagos et al. ................ 705/8 |

FOREIGN PATENT DOCUMENTS

| | | |
|---|---|---|
| DE | 195 09 386 | 9/1995 |
| DE | 198 53 013 | 9/1999 |
| EP | 1 045 302 A1 | 4/2000 |
| WO | WO 00/58799 | 10/2000 |

OTHER PUBLICATIONS

Olav W. Bertelsen et al.; "Augmented Reality as a Design Tool for Mobile Interfaces", DIS2000; Designing Interactive systems Processes, Practices, Methods, and Techniques, Conference Proceedings ACM New York, NY, Aug. 19, 2000.

* cited by examiner

*Primary Examiner*—Anthony Knight
*Assistant Examiner*—Thomas Pham
(74) *Attorney, Agent, or Firm*—Baker Botts L.L.P.

(57) ABSTRACT

The operation of automation components is to be configured conveniently. Consequently, use is made of generally available IT units, for example PDA or mobile radio telephones, as simple HMI (Human Machine Interface). In this case, the nearest automation component can be displayed visually to the operator. The processing of conversion processes or service routines can be controlled by workflows. Furthermore, personalized or unit-specific access rights can be awarded.

18 Claims, 1 Drawing Sheet

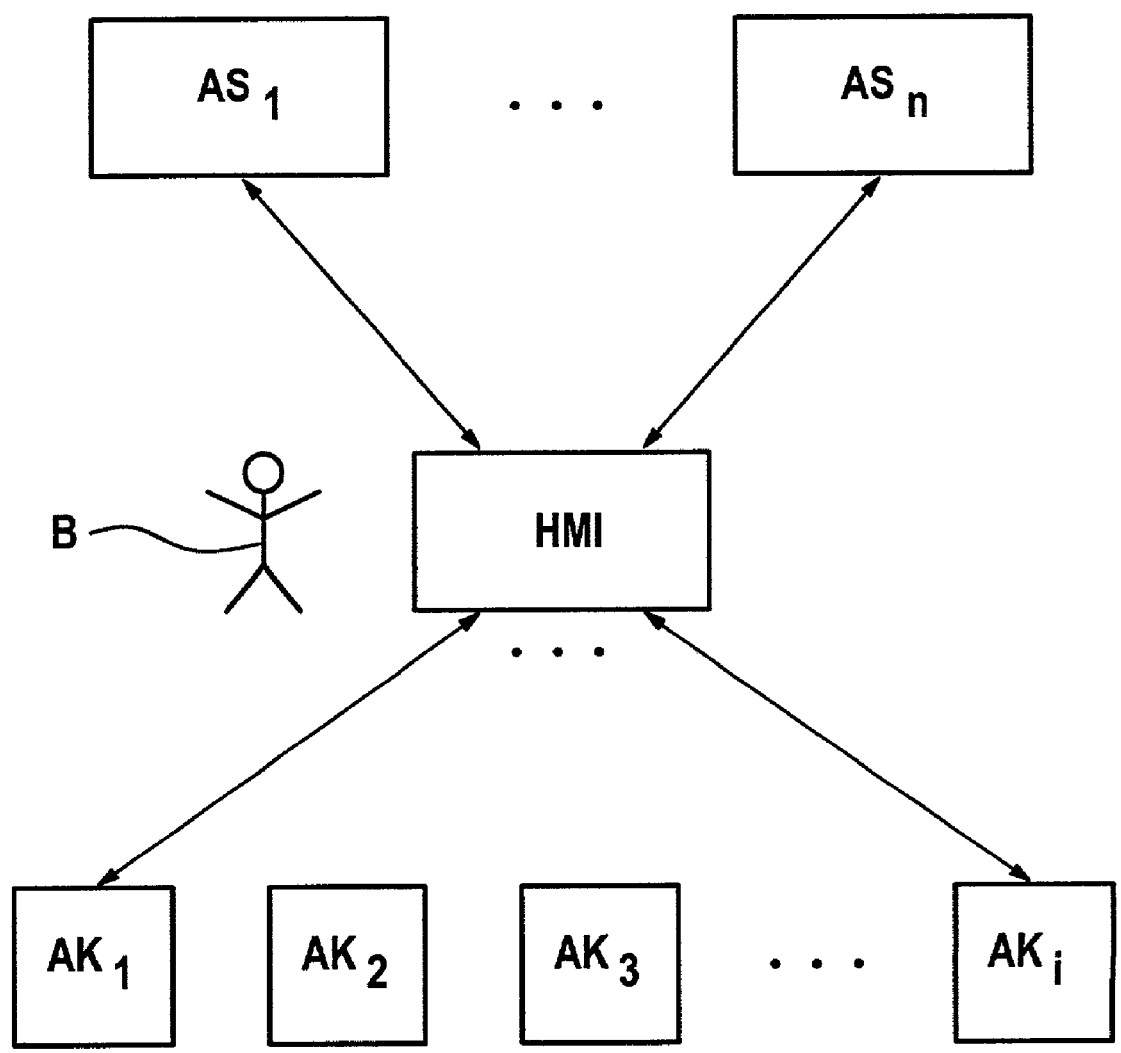

DEVICE AND PROCESS FOR OPERATION OF AUTOMATION COMPONENTS

FIELD OF THE INVENTION

The present invention relates to an apparatus and a method for operating and/or observing automation components, having a communication device for data communication with the automation components, in particular via radio, and a data processing device for processing the data received and to be transmitted.

Complete controllers are designed and programmed in engineering systems. Control variables are parameterized and combined in individual engineering steps. The designs resulting therefrom, including the programs, configurations, images, operating and observing variables, etc are generally stored in the automation component, that is to say in the controller or in the drive.

Many operating or HMI (Human Machine Interface) units are provided with the aid of which the controllers can be operated in a user-friendly fashion. The HMI units serve in this case for visualizing and setting relevant control variables.

HMI units can be permanently connected to the controller, or can be mobile instead. Usually, they are designed as proprietary units and are offered by the manufacturer of the system software. Moreover, however, use is also made, for of note books or standard PCs as HMI units which are connected to the data to which the automation component is connected.

It is also known to use cell phones as fault indicators for automation components. For example, in this case SMS short messages are sent to the owner of the cell phone in the event of a fault.

The object of the present invention consists in rendering the operation of automation components, in particular controllers and drives, more convenient by means of mobile operating devices.

According to the invention, this object is achieved by means of an apparatus for operating and/or observing automation components, having a communication device for data communication with the automation components, in particular via radio, and a data processing device for processing the data received and to be transmitted, the apparatus being a mobile radio telephone, a personal digital assistant or a portable computer.

Furthermore, the object is achieved by an apparatus for operating and/or observing automation components, having a communication device for data communication with the automation components, in particular via radio, and a data processing device for processing the data received and to be transmitted, an authorization device being provided for acquiring operator identification information from an operator for the purpose of establishing the authorization of the latter to operate the automation components, or it being possible to use the data processing device to evaluate the data received from the automation components with regard to the spatial distance of the respective automation component from the location of the apparatus such that a nearest automation component can be detected.

Moreover, the abovenamed object is achieved by means of an apparatus for operating and/or observing automation components, having a communication device for data communication with the automation components, in particular via radio, and a data processing device for processing the data received and to be transmitted, it being possible to use the data processing device to call up and/or process workflows for commissioning, converting and/or servicing the automation components and/or an external server.

The corresponding methods according to the invention are to be found in claims 12, 16 and 19. Advantageous developments of the invention follow from the subclaims.

Particular advantages of the present invention consist in that there is no longer a need for any proprietary simple HMI units, but that commercially available units such as mobile radio telephones or PDAs (Personal Digital Assistants) can be used as simple HMI units for automation components. Such units can be used in a facility to display the nearest station, to process workflows, for example for machine conversion, and to award access rights for operators and operating devices.

The present invention will now be explained in more detail with the aid of the attached drawing, which shows the principle of the operational relationship between a mobile HMI unit, automation components, a central server and an operator.

The exemplary embodiment described below constitutes a preferred embodiment of the present invention.

The figure shows the fundamental signal flow diagram of automation components $AK_1$, $AK_2$, $AK_3$, ... $AK_i$, which are driven by an EMI unit HMI. An operator B uses the HMI unit in order to commission the automation components, to undertake adjustments, or to service the controllers. The HMI unit can draw additional information from one or more facility servers $AS_1$, ..., $AS_n$. The facility server can be present in the HMI unit or in the automation component as an independent server. Such information could be, for example, data, workflows or logfiles for logging purposes.

Within the scope of this description, the HMI unit is understood, in particular, as a single HMI to be used for the following functions, for example:

a) Commissioning Fictions:
   The commissioning of the controller or the drive requires a control program for/on the machine to be fundamentally set and adapted. The further functioning of the application commissioning requires machine-specific settings or adaptations to the respective machine, this also including the setting of technical variables.

b) Production Mode:
   During the production mode, there is a need for recipe management and, if appropriate, a change of recipe. This requires, for example, setting of the product, the number of items, the production cycle and further production properties. Furthermore, during the production mode it should be possible to change the format such that it is possible for settings of machine parameters which are relevant to the job to be configured flexibly. The optical and/or graphical representation of quality data or production data for monitoring purposes is an extraordinarily important function during running operation.

c) Servicing Case:
   In the case of a fault, the simple HMI should also be capable of displaying servicing data to a certain extent so that faults can be removed specifically without needing to go deep into the run time system of an automation component.

The simple HMI is advantageously mobile. This presupposes a radio link or a cable link, for example to an intranet. Such a mobile HMI unit constitutes, for example, a notebook which is connected to the intranet of a facility. Use may be made for this purpose of, for example, Plug & Play cable links between the mobile unit and the automation component.

Alternatively, the link between the simple HMI and automation component can be set up via radio. It is conceivable in this connection also to have a radio link to a station which is connected via a communication interface to one or more automation components. Powerful telecommunication facilities, for example UMTS systems for transmitting multimedia messages, are particularly suitable for providing a high level of functionality of the simple HMI. Server functionality can be integrated in the automation component. Thus, the automation component can serve as web server or UMTS server, for example. Moreover, a higher level web server can be used for a plurality of automation components.

According to the invention, the simple HMI unit can be a mobile radio telephone or cell phone. The automation component can be dialed with the aid of the mobile radio telephone and a link can be set up automatically. Complex multimedia messages can thus be exchanged in UMTS mode.

If a facility comprises a plurality of controllers and drives, it is in some circumstances very difficult for the service personnel to dial into a specific automation component. Consequently, all the automation components relevant to the user are symbolized for him on the display of the mobile radio telephone by symbols, abbreviations or abbreviated numbers. The user can then browse in the automation component visualized on the cell phone, if a suitable browser has been loaded into the cell phone.

The visualization of the relevant automation components can be refined to the effect that the spatially nearest automation component is displayed graphically to the operator on the cell phone or mobile. This can be performed, for example, by representing the symbol of the nearest automation component in a fashion which is larger, flashing or uses a different color. A GPS system, determination of delay time or signal attenuation can be used to measure the spatial distance between the automation component and the cell phone or mobile HMI unit. The advantage of determining the nearest automation component resides in that it is possible, for example, for a service technician to identify immediately in front of which of the displayed automation components he is situated.

One embodiment of the present invention permits the functions to be supported by workflow management in the case of commissioning, production operation and servicing. Functions are thereby executed semi-automatically or automatically between the simple HMI and the automation component. A case of automatic workflow control would be application commissioning of a plurality of similar automation components, the machine-specific settings being performed, for example, by pressing buttons.

An example of semi-automatic workflow control would be conversion for a new machine or a new job. In both cases, the user would be instructed to download the relevant data for himself from a specially provided server, and to install them in the machine in accordance with prescribed instructions.

The use of workflows is also suitable for the case of servicing when, for example, predefined service routines are to be run through.

The workflow can be prescribed by the automation component, that is to say by the controller or the drive and/or in the machine or by a further server.

A further embodiment according to the invention consists in undertaking personalized settings on the mobile HMI unit. In this connection, access rights to the controller can be awarded for the purpose of increasing security. One variant consists in coupling the rights to the operating device, the access rights to the machine being controlled via the simple HMI unit. In this case, the HMI unit can exchange access codes with the automation component, for example using the handshake method, and thus establish the authorization of the operating device. Checking of the access rights can also be controlled by a workflow.

When the operator makes himself known to the HMI unit by means of a PIN number, for example, the HMI unit can derive user rights therefrom. It is therefore possible to monitor which user is permitted to undertake which changes to the controller. Moreover, if the HMI unit has identified the user, a personalized default setting can be undertaken in the user interface.

A mobile HMI unit is distinguished according to the invention by one or more of the following properties:
- the unit can be coupled to an automation component via a radio or cable link (for example Ethernet);
- the unit optionally has a link to further servers;
- the unit includes mechanisms for equipment identification;
- the unit includes mechanisms for user identification.

In summary, a mobile HMI unit, according to the invention provides the following functions:
- commissioning functions for the automation component;
- commissioning of the controller or the drive;
- application commissioning (machine-specific settings or adaptation to a respective machine);
- use in production mode of the machine;
- recipe management and change of recipe (job data: number of items, quality, further production properties);
- change of format (setting of machine variables which are relevant to the job);
- display of quality data or production data;
- case of servicing;
- servicing displays;
- workflow management for commissioning, production mode (recipe management) and servicing.

The machine and/or the application commissioning and/or the machine converting and/or servicing can be performed by guided operation with the aid of workflows. The following steps and features are conceivable in this case:
- the controller calls up converters in the production mode (I need new data)—workflow machine;
- the workflow is stored on the controller or on the external server;
- the controller or the machine operator calls up the workflow;
- the machine operator executes an activity in accordance with the workflow;
- the machine operator controls/processes the workflow by means of appropriate acknowledgements;
- the processed workflow can be logged (controller/server).

The identification and visualization according to the invention of automation components in an industrial facility comprises one or more of the following steps in summary:
- automatic link setup between an automation component and mobile device;
- visualization of the spatially nearest automation components on the mobile device—visualization can be performed by a graphic symbol or text;
- visualization of the automation components relevant to a user (for example for a service technician in a facility);
- browsing in the automation component visualized on the cell phone.

In an advantageous way, the authorized operation of automation components is ensured by one or more of the following steps:

personalization of mobile HMI units (binding of operating rights to a device);

the device identifies the user (user identification by device), for example password, dongle, memory card such as MMC card, fingerprint;

the device has access to the controller and, optionally, to an external server.

The use of the generally available IT units, for example PDA, cell phones, palmtops, etc. or other mobile IT units as simple HMI for automation components such as controllers and drives proves to be advantageous in each case.

The invention claimed is:

1. A system for operating and/or observing automation components, comprising a plurality of automation components each comprising a wireless transceiver, and a device for wireless data communication with the transceivers of the automation components including a data processing device for processing data received and to be transmitted, wherein the data processing device identifies all automation components with which communication has been established and determines a spatial distance of said automation components from a location of the device for wireless data communication, wherein a nearest automation component is detected, and wherein the system further comprises a graphics display for visualizing the location of the identified automation components which are in data communication with the apparatus using symbols uniquely assigned to the automation components, wherein the nearest automation component is visualized by predetermined symbols or highlighting.

2. The system according to claim 1, wherein multimedia messages can be processed and transmitted via the data processing device.

3. The system according to claim 1, further comprising an authorization device for acquiring operator identification information from an operator to establish authorization to operate the automation components.

4. The system according to claim 3, wherein the authorization device can send operator unit identification information to the automation components and/or to external servers.

5. The system according to claim 4, wherein the operator identification information can be acquired from a password, a PIN, a dongle, a memory card and/or a fingerprint.

6. The system according to claim 1, wherein the data processing device is used to call up and/or process workflows for commissioning, converting and/or servicing the automation components and/or an external server.

7. The system according to claim 6, further comprising a display device for optically guiding an operator when processing a workflow.

8. The system according to claim 6, further comprising an input/output device for controlling and/or processing a workflow by the operator.

9. A method for operating and/or observing a system of automation components comprising the steps of:

wirelessly communicating data to the automation components by a mobile device, processing the data received and to be transmitted to the automation components, evaluating the data received from the automation components thereby identifying all automation components with which communication has been established and determining a spatial distance of each automation component from an operating location and identifying a automation component nearest to said operation location;

visualizing the location of said automation components with which data communication exists via uniquely assigned symbols or texts on a display, and visualizing the nearest automation component by predetermined symbols or highlighting.

10. The method according to claim 9, wherein the data are for communicating and processing multimedia messages.

11. The method according to claim 9, further comprising acquiring operator identification information from an operator to establish authorization to operate the automation components.

12. The method according to claim 11, wherein communication comprises sending operator unit identification information to the automation components and/or to external servers such that the automation components and/or the external servers can check the authorization to operate.

13. The method according to claim 11, in which operator identification information is acquired from a password, a PIN, a dongle, a memory card and/or a fingerprint.

14. The method according to claim 9, further comprising calling up and/or processing workflows for commissioning, converting and/or servicing the automation components and/or an external server.

15. The method according to claim 14, further comprising optically guiding an operator when processing a workflow.

16. The method according to claim 14, wherein workflows are controlled and/or processed by an operator.

17. The method according to claim 14, further comprising login the work steps carried out by operator.

18. A system for operating and/or observing automation components, comprising a plurality of automation components each comprising a wireless transceiver, and a device for wireless data communication with the transceivers of the automation components including a data processing device for processing data received and to be transmitted, wherein the data processing device identifies all automation components with which communication has been established and determines a spatial distance of said automation components from a location of the device for wireless data communication, wherein a nearest automation component is detected, and wherein the system further comprises a display for displaying the identified automation components which are in data communication with the apparatus using symbols or text uniquely assigned to the automation components, wherein the nearest automation component is visualized by predetermined symbols or highlighting.

* * * * *